(12) United States Patent
Gaither

(10) Patent No.: US 7,085,887 B2
(45) Date of Patent: Aug. 1, 2006

(54) PROCESSOR AND PROCESSOR METHOD OF OPERATION

(75) Inventor: Blaine D. Gaither, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 364 days.

(21) Appl. No.: 10/645,738

(22) Filed: Aug. 21, 2003

(65) Prior Publication Data

US 2005/0044326 A1    Feb. 24, 2005

(51) Int. Cl.
*G06F 12/06* (2006.01)
(52) U.S. Cl. .................................... 711/127
(58) Field of Classification Search ............... 711/127, 711/128, 3
See application file for complete search history.

(56) References Cited

U.S. PATENT DOCUMENTS

| | | | | |
|---|---|---|---|---|
| 4,905,188 | A | * | 2/1990 | Chuang et al. ............. 711/128 |
| 5,559,986 | A | * | 9/1996 | Alpert et al. ............... 711/144 |
| 2003/0188105 | A1 | * | 10/2003 | Middleton .................. 711/128 |

* cited by examiner

*Primary Examiner*—Kevin L. Ellis

(57) ABSTRACT

In one embodiment, the present invention is directed to a processor that comprises an instruction pipeline for executing processor instructions wherein the processor instructions define a memory access size and a cache memory for storing cache lines in a plurality of memory banks that have a block size that is greater than the memory access size, the cache memory including mapping logic for storing contiguous groups of bits, of size equal to the memory access size, in different ones of the plurality of memory banks.

20 Claims, 4 Drawing Sheets

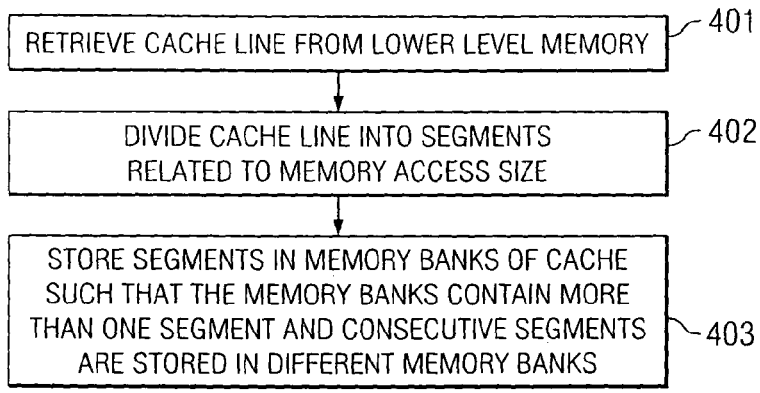
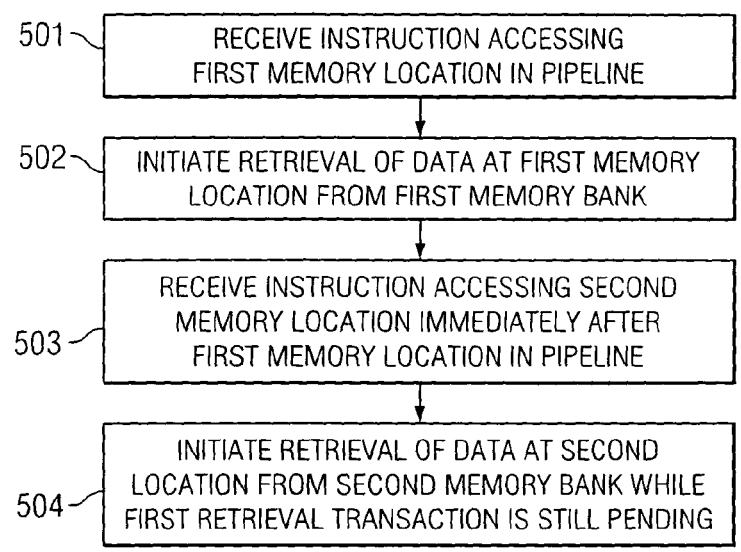
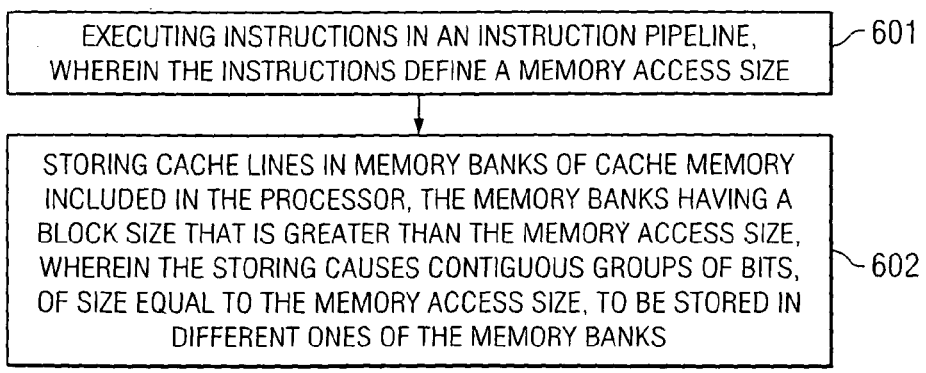

PROCESSOR AND PROCESSOR METHOD OF OPERATION

BACKGROUND

At the present time, although a wide variety of processor-types are commercially available, most processors utilize a relatively common architecture. For example, FIG. 1 depicts a block diagram of processor 100 implemented utilizing a known architecture. Processor 100 includes memory interface unit 101 that interfaces via a bus with lower level memory (e.g., a lower level cache or main memory) which is not shown. Processor 100 further includes data cache 102 and instruction cache 103. Data cache 102 and instruction cache 103 typically employ a relatively efficient implementation of random access memory (RAM), such as synchronous RAM (SRAM), for on-chip memory transactions. In other known architectures, data cache 102 and instruction cache 103 are integrated within a single element of processor 100.

Processor 100 further includes translation lookaside buffer (TLB) 104. TLB 104 typically provides a mapping between virtual addresses and physical addresses. Load/store unit (LSU) 105 with load queue 106 and store queue 107 generates the virtual addresses associated with loads and stores. LSU 105 further accesses data cache 102. Pre-fetch and dispatch unit (PDU) 108 accesses instruction cache 103 to fetch instructions for provision to functional units 110. Instruction buffer 109 may be utilized to facilitate pre-fetching of instructions before the instructions are required by the instruction pipeline. Functional units 110 provide processing functionality, such as integer operations, floating point operations, and/or the like, for various instructions supported by processor 100.

The architecture of processor 100 utilizes two techniques to optimize processor performance. The first of these techniques is caching. Data cache 102 and instruction cache 103 increase system performance because there is a higher probability that, once processor 100 has accessed a data element at a particular address, a subsequent access to an address within the same general memory region will occur. Accordingly, when processor 100 requests data from a particular address, data (e.g., a cache line) from a plurality of "nearby" addresses is transferred from a slower, main memory to cache memory. Then, when processor 100 requests data from another address within the cache line, there is no need to access the slower main memory. The data from the other address may be obtained directly from cache memory.

The second technique involves implementing functional units 110 in a manner that enables functional units 110 to execute multiple instructions simultaneously. In general, an instruction starts execution if the respective issue conditions are satisfied. If not, the instruction is installed until the conditions are satisfied. Such interlock (pipeline) delay typically causes the interruption of the fetching of successive instructions or equivalently necessitates "no-op" instructions. One important limitation upon the ability to execute multiple instructions simultaneously is the availability of data to be processed by the execution of the instructions. For example, if an instruction causes the multiplication of two floating point numbers, the instruction cannot be executed until the two floating point numbers are obtained from memory. Thus, the unavailability of data due to memory constraints can limit the parallel processing capability of a processor.

SUMMARY

In one embodiment, the present invention is directed to a processor that comprises an instruction pipeline for executing processor instructions wherein the processor instruction define a memory access size and a cache memory for storing cache lines in a plurality of memory banks that have a block size that is greater than the memory access size, the cache memory including mapping logic for storing contiguous groups of bits, of size equal to the memory access size, in different ones of the plurality of memory banks.

BRIEF DESCRIPTION OF THE DRAWINGS

FIG. 4 depicts a flowchart for storing data in memory banks of cache memory according to a representative embodiment.

FIG. 5 depicts a flowchart for retrieving data from memory banks of cache memory according to a representative embodiment.

FIG. 6 depicts a flowchart for a method of operation of a processor.

DETAILED DESCRIPTION

Some representative embodiments of the invention are directed to systems and methods for minimizing bank conflicts when accessing cache memory. Specifically, when known caching mechanisms store cache lines in memory banks and processors retrieve a number of bits of data from the memory banks that is less than the block width of the memory banks, memory bank contention may occur between sequential instructions. That is, a first instruction to a first memory address may initiate memory access to a given memory bank. A second instruction to a second memory address that is immediately after the first memory address may then initiate memory access to the same memory bank. If the first memory access is still pending, the second instruction is stalled and cannot begin until the first memory access is completed. Thus, known caching mechanisms reduce the parallel processing capacity of a processor.

In contrast, certain representative embodiments of the invention enable conflicting memory accesses to be minimized by suitably configuring the manner in which data is stored within the banks of cache memory according to the defined memory access size of respective instructions. Such representative embodiments are particularly advantageous for execution of scientific or other computationally intensive programs. Specifically, programs that sequentially access data from memory may be executed with a greater degree of parallelism according to these embodiments than possible when executed according to known processor architectures.

Figure 1:
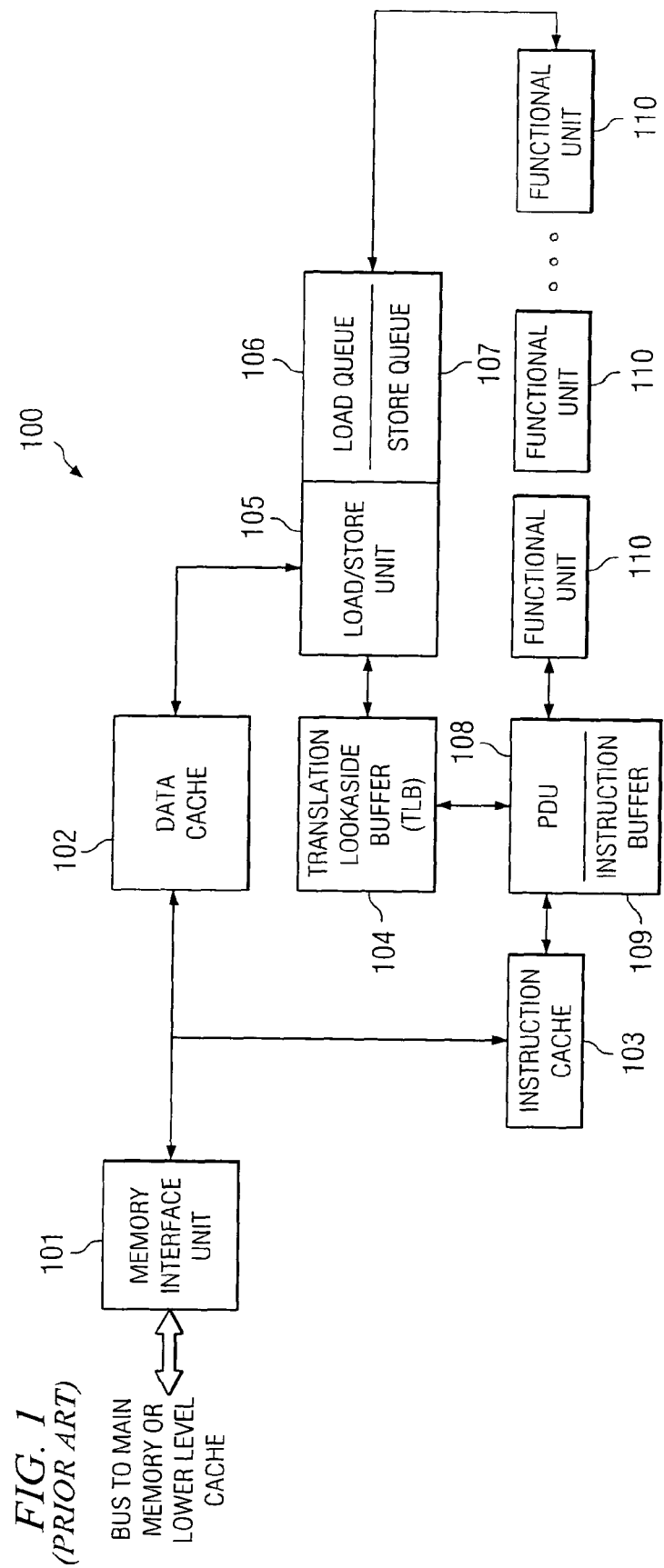
FIG. 1 depicts a block diagram of a processor according to the prior art.
Figure 2:
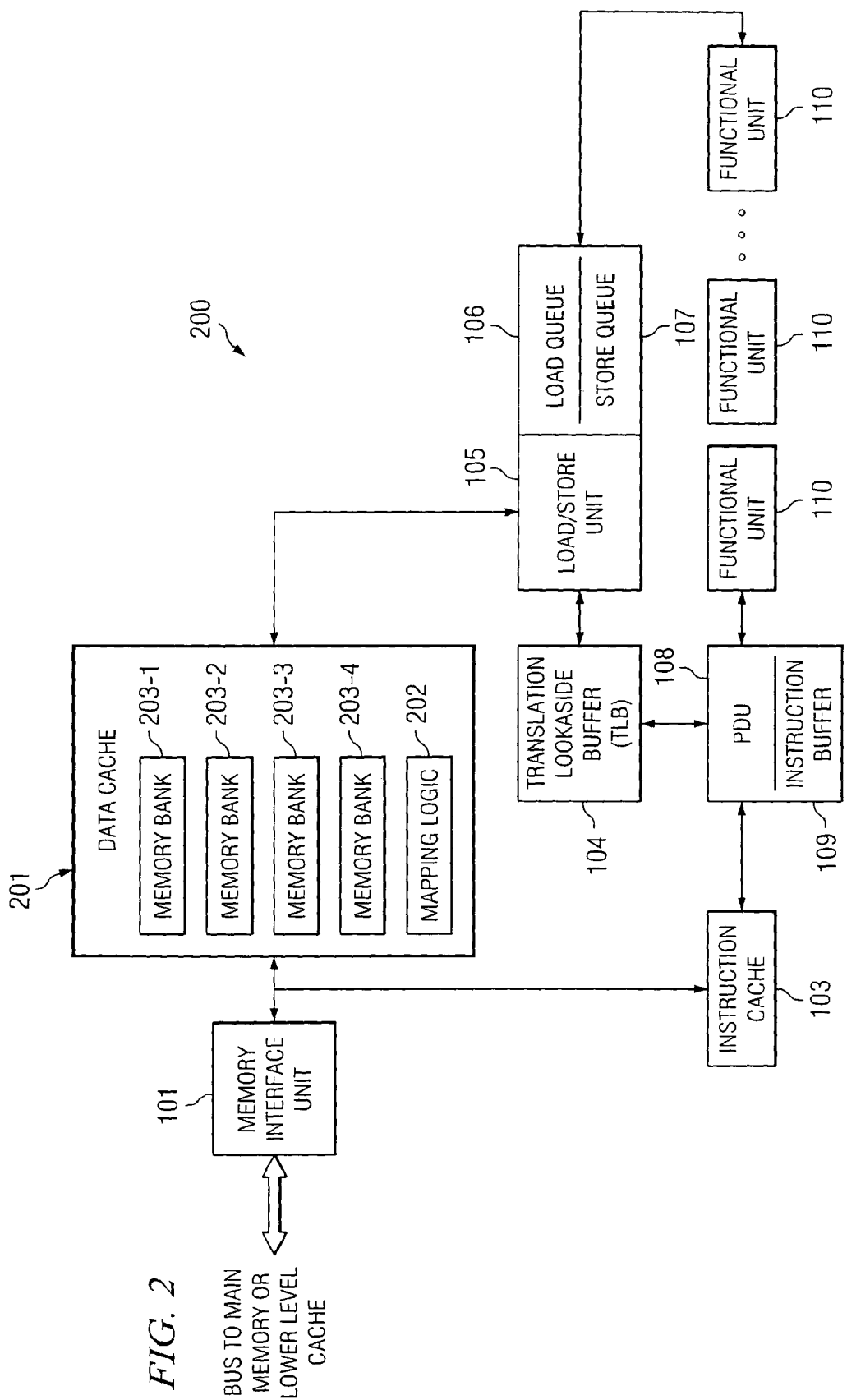
FIG. 2 depicts a block diagram of a processor according to a representative embodiment.

FIG. 2 depicts processor 200 according to one representative embodiment of the invention. Processor 200 includes memory interface unit 101. Memory interface unit 101 facilitates the storage and retrieval of cache lines from main memory or a lower level cache in response to data cache 201 and instruction cache 103. Specifically, when a cache line is to be retrieved, data cache 201 communicates with memory interface unit 101. Memory interface unit 101 utilizes a suitable bus (not shown) to obtain the data associated with the cache line from main memory. Memory interface unit 101 communicates the data to data cache 101. Mapping logic 202 receives the data from memory interface unit 101 and stores the data across, for example, banks 203-1 through 203-4 according to a defined mapping scheme. It shall be appreciated the additional or fewer memory banks 203 may be utilized to implement various representative embodiments.

In this representative embodiment, the mapping scheme is selected according to the size of the memory bank blocks and the size of the memory access size associated with one or more instructions. The block size of memory banks 203 is selected to be greater than the memory access size associated with one or more instructions. Mapping logic 202 stores a cache line across memory banks 203 by dividing a cache line into groups of bits where the size of the groups is related to the memory access size. Specifically, the groups of bits are stored in memory banks 203 by mapping logic 202 such that no two contiguous groups of bits are stored in the same memory bank 203. By doing so, sequential accesses to addresses in a cache line according to the memory access size will not stall due to memory bank contention.

Figure 3:
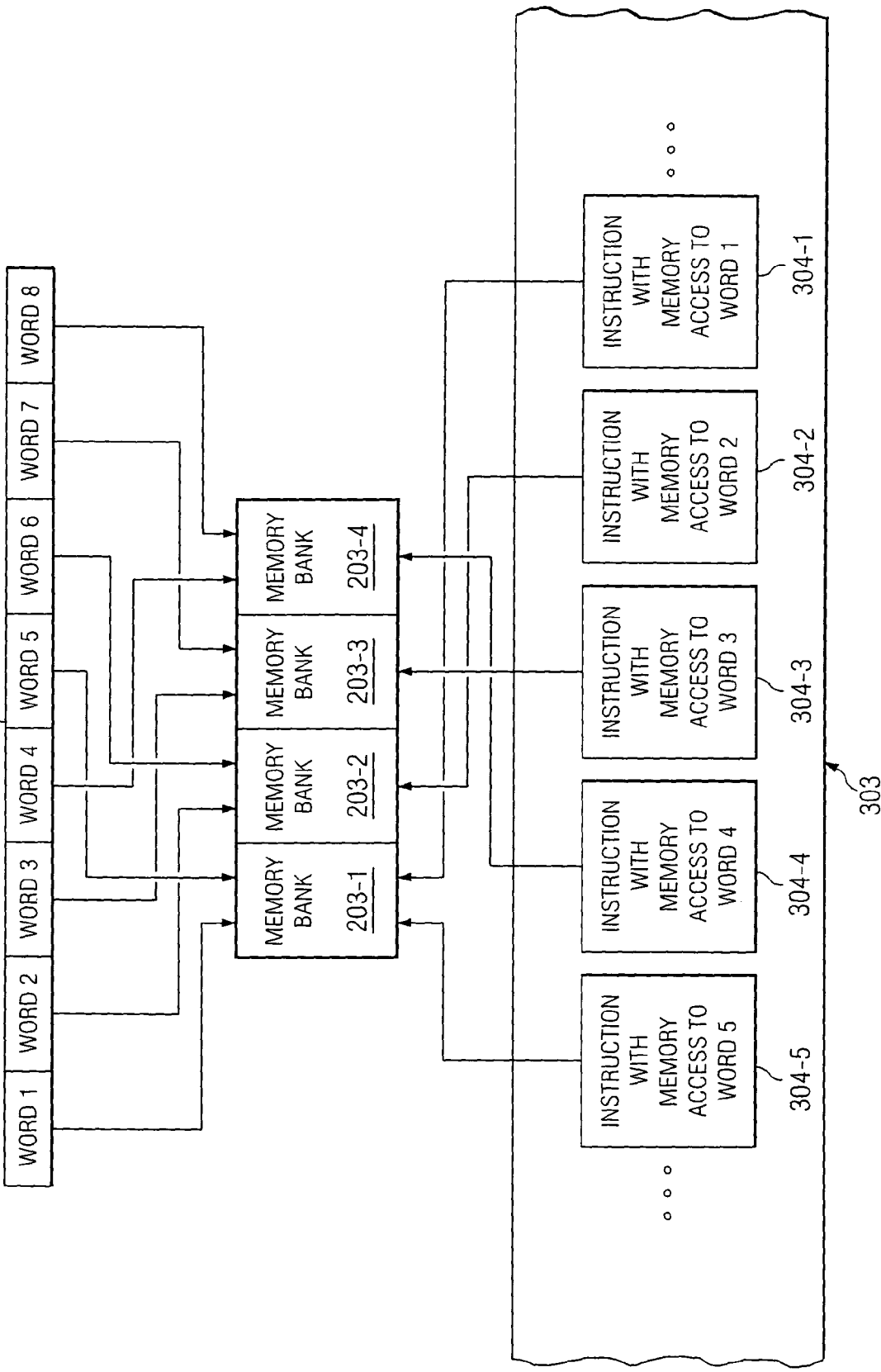
FIG. 3 depicts mapping of a cache line to memory banks and retrieval of data within the cache line during pipeline execution of instructions according to a representative

FIG. 3 depicts mapping of cache line 301 to memory banks 203-1 through 203-4 and retrieval of data within cache line 301 during pipeline execution of instructions according to this representative embodiment. For the purpose of discussing this representative embodiment, it will be assumed that the cache line size is eight words (which have 16 bits each) and that the respective memory access instructions retrieve a single word (16 bits). Also, it will be assumed that the width of memory banks 203 is two words (32 bits). A mapping scheme for implementation by mapping logic 202 could map the first and fifth words of cache line 301 to bank 203-1, the second and sixth words to bank 203-2, the third and seventh words to bank 203-3, and the fourth and eighth words to bank 203-4. It shall be appreciated that this mapping scheme is by way of example only. In other embodiments, other mapping schemes are employed to store adjacent words or adjacent groups of bits in respective memory banks 203.

To illustrate the relationship between the mapping scheme and the execution of sequential codes, a hypothetical application that sums the values in a vector will be discussed. In the hypothetical application, the vector is represented by a data structure stored in consecutive memory locations. The magnitude of each vector element is represented by a single word (16 bits). The application performs various operations that cause one or several cache lines containing the data structure to be loaded into data cache 201. The hypothetical application iteratively retrieves a respective word from a memory address offset from the starting address of the vector data structure and adds the retrieved word to a register.

In the iterative loop, the same instructions are repetitively obtained by PDU 108 (shown previously in FIG. 2) and enter instruction pipeline 303 to be executed by one or several of functional units 110 (shown previously in FIG. 2). The first memory access instruction 304-1 in the iterative loop enters pipeline 303 first. Instruction 304-1 accesses the word associated with the first vector element which is assumed to be the first address (i.e., the first word) in cache line 301. Instruction pipeline 303 causes the retrieval of the first word from memory bank 203-1 to be initiated. Due to memory bank limitations, the memory access may require more than one cycle to complete the retrieval of the relevant word.

Instruction 304-2 that accesses the word associated with the second vector element enters instruction pipeline 303 almost immediately after instruction 304-1. Due to the sequential nature of the code of the hypothetical application, instruction 304-2 causes a memory access to the memory address (word two in cache line 301) immediately after the word addressed by instruction 304-1. However, this memory address is not located sequentially in memory banks 203 after the prior memory address. Specifically, the fifth word is stored sequentially after word 1. The memory address associated with the second word is mapped to another memory bank 203 (i.e., memory bank 203-2). Thus, instruction pipeline 303 causes the retrieval of the second word from memory bank 203-2 to be initiated while memory bank 203-1 is still performing the retrieval of the first word.

This iterative process continues by initiating the retrieval of words three and four from memory banks 203-3 and 203-4 by instructions 304-3 and 304-4. When the iterative process reaches instruction 304-5, another memory access to memory bank 203-1 occurs. However, by the time instruction 304-5 enters instruction pipeline 303, a sufficient number of instructions have been executed to allow the previous memory access associated with memory bank 203-1 to be completed. Thus, the latency associated with memory banks 203-1 through 203-4 does not stall the instruction pipeline when mapping logic 202 is suitably implemented.

FIG. 4 depicts a flowchart for storing data in memory banks of cache memory according to one representative embodiment. In step 401, a cache line is retrieved from lower level memory which may be main memory or a lower level cache. In step 402, the retrieved cache line is divided into segments that are related to the memory access size of one or more processor instructions. In step 403, the segments are stored in memory banks of the cache memory such that the memory banks contain more than one segment and consecutive segments of the cache line are stored in different memory banks.

FIG. 5 depicts a flowchart for retrieving data from memory banks of cache memory according to some representative embodiments. In step 501, an instruction accessing a first memory location is received in an instruction pipeline. In step 502, the retrieval of data from the first memory location from a first memory bank is initiated. In step 503, an instruction accessing a second memory location that is immediately after the first memory location is received in the instruction pipeline. In step 504, the retrieval of data from the second memory location is initiated while the first retrieval transaction is still pending.

FIG. 6 depicts a flowchart for a method of operation of a processor. The method comprises, in step 601, executing instructions in an instruction pipeline wherein the instructions define a memory access size. The method further comprises, in step 602, storing cache lines in memory banks of cache memory included in the processor, the memory banks having a block size that is greater than the memory access size, wherein the storing causes contiguous groups of bits, of size equal to the memory access size, to be stored in different ones of the memory banks.

Some representative embodiments of the invention may provide a number of advantages. Specifically, the performance of cache memory accesses may be improved by avoiding pipeline delays associated with conflicting memory bank access. By doing so, these representative embodiments enable sequential processing of data to occur in an efficient manner. Thus, applications that perform scientific or other computationally intensive tasks may be executed with a greater degree of parallelism that possible utilizing known processor designs.

The invention claimed is:

1. A processor, comprising:
an instruction pipeline for executing processor instructions wherein said processor instructions define a memory access size; and
a cache memory for storing cache lines in a plurality of memory banks that have a block size that is greater than said memory access size, said cache memory including mapping logic for storing contiguous groups of bits, of size equal to said memory access size, in different ones of said plurality of memory banks.

2. The processor of claim 1, wherein said instruction pipeline comprises:
a plurality of functional units for executing said processor instructions.

3. The processor of claim 2 wherein said plurality of functional units are operable to initiate a memory access to a first memory address of data stored in said cache memory during pipeline execution of a first processor instruction while memory access to a second memory address that is immediately before said first memory address is occurring during pipeline execution of a second processor instruction.

4. The processor of claim 3 wherein said first processor instruction is obtained by an instruction fetch unit while said second processor instruction is being processed in said instruction pipeline.

5. The processor of claim 1 wherein said cache memory obtains cache lines from main memory.

6. The processor of claim 1 wherein said cache memory obtains cache lines from a lower level cache.

7. The processor of claim 1 wherein said mapping logic stores adjacent words in said cache lines in different ones of said plurality of memory banks.

8. A method for operating a processor, comprising:
executing instructions in an instruction pipeline, wherein said instructions define a memory access size;
storing cache lines in memory banks of cache memory included in said processor, said memory banks having a block size that is greater than said memory access size, wherein said storing causes contiguous groups of bits, of size equal to said memory access size, to be stored in different ones of said memory banks.

9. The method of claim 8 wherein said executing instruction in said instruction pipeline includes:
executing instructions in a plurality of functional units in parallel.

10. The method of claim 8 further including:
initiating a first memory access to a first memory address of data stored in said cache memory during pipeline execution of a first instruction; and
initiating a second memory access to a second memory address of data stored in said cache memory during pipeline execution of a second instruction while said first memory access is pending, wherein said second memory address is immediately after said first memory address by a number of bits equal to said memory access size.

11. The method of claim 10 further comprising:
fetching said second instruction while said first memory access is pending.

12. The method of claim 8 further comprising:
retrieving cache lines from main memory; and
storing said cache lines in said cache memory.

13. The method of claim 8 further comprising:
retrieving cache lines from a lower level cache; and
storing said cache lines in said cache memory.

14. The method of claim 8 wherein said storing stores adjacent words in said cache lines in different ones of said memory banks.

15. A processor, comprising:
a pipeline means for executing processor instructions wherein said processor instructions define a memory access size; and
a cache memory means for storing cache lines in memory banks according to a block size that is greater than said memory access size, wherein said cache memory means stores contiguous groups of bits, of size equal to said memory access size, in different ones of said plurality of memory banks.

16. The processor of claim 15 wherein said pipeline means includes:
a plurality of functional units for executing said processor instructions in parallel.

17. The processor of claim 16 wherein said plurality of functional units are operable to initiate a memory access to a first memory address of data stored in said cache memory means during pipeline execution of a first processor instruction while memory access to a second memory address that is immediately before said first memory address is occurring during pipeline execution of a second processor instruction.

18. The processor of claim 17 further comprising:
an instruction fetch means for fetching said first and second processor instructions, wherein said instruction fetch means fetches said first processor instruction while said second memory access is occurrnng.

19. The processor of claim 15 wherein said cache memory means retrieves said cache lines from main memory.

20. The processor of claim 15 wherein said cache memory means stores adjacent words of said cache lines in different ones of said memory banks.

* * * * *

UNITED STATES PATENT AND TRADEMARK OFFICE
CERTIFICATE OF CORRECTION

PATENT NO. : 7,085,887 B2 Page 1 of 1
APPLICATION NO. : 10/645738
DATED : August 1, 2006
INVENTOR(S) : Blaine D. Gaither It is certified that error appears in the above-identified patent and that said Letters Patent is hereby corrected as shown below:

In column 1, line 55, delete "installed" and insert -- stalled --, therefor.

In column 2, line 21, after "representative" insert -- embodiment. --.

In column 5, line 39, in Claim 8, after "size;" insert -- and --.

In column 6, line 46, in Claim 18, delete "occurnng" and insert -- occurring --, therefor.

Signed and Sealed this

Thirty-first Day of March, 2009

JOHN DOLL
*Acting Director of the United States Patent and Trademark Office*